Aug. 5, 1958 L. P. CROSS 2,845,655
SAUSAGE LINKING MACHINE
Filed Dec. 31, 1953 7 Sheets-Sheet 1

Fig.1

INVENTOR.
Lawrence P. Cross,
BY
Cromwell, Greist & Warden
Attys.

Aug. 5, 1958

L. P. CROSS

2,845,655

SAUSAGE LINKING MACHINE

Filed Dec. 31, 1953

INVENTOR.
Lawrence P. Cross,
BY
Cromwell, Greist & Warden
Attys

Aug. 5, 1958

L. P. CROSS

2,845,655

SAUSAGE LINKING MACHINE

Filed Dec. 31, 1953

INVENTOR.
Lawrence P. Cross,
BY
Cromwell, Greist-Warden
Attys.

Aug. 5, 1958 L. P. CROSS 2,845,655
SAUSAGE LINKING MACHINE
Filed Dec. 31, 1953 7 Sheets-Sheet 7

INVENTOR.
Lawrence P. Cross,
BY
Cromwell, Greist + Warden
Attys

United States Patent Office 2,845,655
Patented Aug. 5, 1958

2,845,655

SAUSAGE LINKING MACHINE

Lawrence P. Cross, Valparaiso, Ind.

Application December 31, 1953, Serial No. 401,600

19 Claims. (Cl. 17—34)

This invention relates to the manufacture of sausages or similar products in which a length of filled or stuffed casing is divided into individual links of generally uniform length and the casing is twisted between each link and the next adjoining links.

It is a general object of the invention to provide an improved mechanism for the production of link sausages or like products, which mechanism will divide a filled casing at predetermined intervals to form a plurality of individual links of uniform length and automatically rotate each successive link in the same direction to provide one or more twists in the casing between each link and the next succeeding link.

It is a more specific object of the invention to provide a linking machine which will automatically divide a filled casing into sections of predetermined length and simultaneously advance the divided sections through a restricted opening and into a collecting receptacle which is rapidly rotated about its axis whereby to impart a twist in the casing between each link and the next succeeding link and to collect the twisted links in coil-like fashion as the twisting is completed.

It is a further object of the invention to provide a linking machine which will automatically divide a filled casing into sections of predetermined length, which will rotate each successive section to impart a twist in the casing between it and the next succeeding section, which will collect the twisted sections or links in coil-like fashion in a rapidly rotating container as the twisting is completed and which will thereafter move the container in a direction laterally of its axis of rotation to a non-rotating position where the accumulated links are readily accessible for removal therefrom.

It is another object of the invention to provide a linking machine which comprises in combination mechanism for continuously feeding a filled casing, mechanism for constricting the casing at spaced points to divide the same into individual link forming sections, mechanism for rotating each successive link to impart a twist in the constricted area between the link and the next succeeding link and mechanism for collecting the twisted links in coil formation wherein a rapidly rotating container is mounted for movement from a link receiving position to a link discharging position and said container is provided with a movable wall section permitting the container to be opened up for ready removal of the coil of links.

It is a further object of the invention to provide in a sausage linking machine mechanism for constricting the filled sausage casing at spaced intervals to divide the same into a plurality of links of predetermined length in combination with a twisting mechanism which comprises a rapidly revolving receptacle having a central aperture aligned with said constricting mechanism for receiving the successive links, and a hollow throat forming ring member mounted for free rotation in said receptacle aperture, which ring member provides a passageway for the links as they advance into the receptacle whereby a twist is imparted to the successive links by centrifugal force and the twisted links are accumulated in coiled relation around the periphery of the receptacle.

It is another object of the invention to provide a linking machine which comprises in combination mechanism for continuously feeding and dividing a filled casing into individual link forming sections of predetermined length, mechanism for rotating each successive link to impart a twist in the contsricted area between the link and the next succeeding link and mechanism for collecting the twisted links into a coil as they are delivered from the casing feeding and dividing mechanism, wherein the twisting and collecting mechanisms comprise a cylindrical container and a mounting therefor which is adapted to selectively support the same in either link receiving or link discharging position, and wherein a drive mechanism is provided for rapidly rotating the container at the link receiving position, which drive mechanism has a separable driving connection with the cylindrical container whereby to permit the container to be released from the drive mechanism and to move by force of its rotation to the link discharging position.

It is a further object of the invention to provide in a sausage linking machine having mechanism for continuously advancing a filled sausage casing and for dividing the casing into individual links, a cylindrical twisting and collecting receptacle rotatably mounted on an arm which is supported for swinging movement to position the receptacle either in link receiving alignment with the casing dividing mechanism or in link discharging relation laterally thereof, and a drive mechanism for rapidly rotating the receptacle when it is in the link receiving position, which drive mechanism has a separable connection with the receptacle whereby the receptacle may be disconnected from the drive and allowed to swing on its supporting arm out of the link receiving position to the link discharging position.

It is a further object of the invention to provide in a sausage linking machine of the type described means for continuously feeding a filled sausage casing in a predetermined path and for dividing the same into a plurality of link forming sections of uniform length which comprises a pair of conveyor mechanisms arranged on opposite sides of the path of movement of the casing, cooperating casing constricting members arranged on the conveyor mechanisms which engage the casing from opposite sides and travel therewith over a predetermined portion of the path thereof and other casing constricting members arranged on one of the conveyor mechanisms and movable in a direction laterally of the advancing movement of the conveyor mechanisms into engagement with the casing as it advances between the conveyor mechanisms whereby to constrict the casing by successive engagement of the constricting members at a plurality of points spaced circumferentially of the casing.

It is another object of the invention to provide in a filled casing advancing and dividing mechanism a pair of endless conveyors, which conveyors are arranged on opposite sides of the path of advancing movement of the casing and present opposed conveyor runs which are in generally parallel spaced planes and between which the filled casing is advanced, longitudinally spaced cross bars on each conveyor, each cross bar being adapted to cooperate with a cross bar on the opposite conveyor for engaging and constricting the casing from opposite sides, pairs of casing constricting members associated with the cross bars on one of the conveyors, the respective constricting members of each pair being positioned on opposite sides of the path of movement of the casing and extending in the direction of the opposite conveyor when said casing advances between said conveyors, and means for controlling the movement of said constricting members toward and from casing engaging and constricting relation with said advancing casing during the movement of the casing between the conveyors.

These and other objects and advantages of the invention will be apparent from a consideration of the mechanisms which are shown by way of illustration in the accompanying drawings, wherein.

Referring to Figs. 1 to 9 of the drawings there is shown a mechanism constructed in accordance with the principles of the invention which will divide a continuous length of a casing filled with sausage meat, or the like, into a plurality of link forming sections of predetermined length, which will successively rotate each link forming section relative to the remainder of the filled casing to impart a twist between it and the next succeeding link, which will accumulate the twisted links in uniform coil-like fashion in a cylindrical receptacle and which will thereafter move the receptacle to a position where it may be easily opened for ready removal of the links.

The mechanism comprises a supporting frame, having the bottom or main portion thereof in the form of a generally rectangular cabinet 10, a divider mechanism 11 which is supported on the upper end of an inverted L-shaped bracket formation 12 which extends above the top surface of the base cabinet 10, and a pair of twisting and accumulating receptacles 13 which are rotatably supported on a swingably mounted bracket or frame formation 14, the latter having radially projecting oppositely directed arms 15, on the ends of which arms the receptacles 13 are located. A power drive mechanism, indicated at 16, is operative by the motor 17 in the housing 10, for rapidly rotating the containers 13 when the respective containers are in operative position beneath the divider mechanism 11 and also for driving the divider mechanism 11 in proper timed relation to the rotation of the driven container 13.

The divider mechanism 11 is mounted in a cabinet 18 which is secured at the upper or outer end of the upstanding bracket 12. The cabinet 18 includes a vertical base plate 19 which is attached to the end of the horizontally extending portion 20 of the bracket 12. The filled casing 21 is fed to the divider mechanism 11 over a grooved feed roller 22 which directs the casing 21 through a horizontally extending upwardly opening guideway forming chute 23 to a smaller idler roller 24 and thence through a vertically extending funnel-like guide chute 25 to the divider mechanism 11. The idler rollers 22 and 24 and the guide chutes 23 and 25 are suitably mounted on a horizontal bracket 26 which is supported on the top of the base plate 19.

The divider mechanism 11 comprises a pair of cooperating elongate endless conveyors 27 and 28 (Figs. 6 to 9) which are mounted on the base plate 19. The conveyor 27 comprises inner and outer spaced endless chains 29 and 30 which are supported at one end on inner and outer axially spaced sprockets 31 and 32 arranged in axially spaced relation on a driver shaft 33. At the other end the conveyor chains 29 and 30 are supported on inner and outer spaced idler sprockets 34 and 35 which are arranged in axially spaced relation on outwardly projecting idler shaft 36. The shafts 33 and 36 are journalled in suitable bearings in the base supporting plate 19. The chains 29 and 30 are connected at longitudinally spaced intervals by transversely extending pairs of casing engaging and constricting bar members 37 and 38. The bar members 37 and 38 of each pair are arranged in spaced relation longitudinally of the chain and the distance between each pair of these members and the next adjacent pair thereof corresponds to the desired length of link. The constricting bars 37 and 38 (Figs. 6 and 9) are angular in cross section and the opposite ends of each bar are attached to transversely aligned links of the chains 29 and 30. The bars 37 and 38 are arranged on adjoining links of the conveyor chains with confronting flanges which are slightly spaced and in parallel relation while the bars are moved along the straight runs of the chains but which will spread apart at an angle to each other as the bars pass around the end of the idler sprockets 34 and 35 and the driven sprockets 31 and 32, as shown particularly in Fig. 9. A plurality of relatively narrow transversely extending bars or narrow plate members 39 are arranged between the pairs of constricting bars 37 and 38, with each of the plate members 39 having an inwardly bowed central portion 40, which plate members 39 are adapted to cooperate with like plate members 39' on the conveyor 28 to engage with and lightly grip the sausage casing as it advances between the conveyors 27 and 28.

The conveyor 28 is of the same general construction as conveyor 27 and comprises spaced inner and outer endless chains 41 and 42 which are supported at the lower end on inner and outer driven sprockets 43 and 44 which are axially spaced on the shaft 45. At the other end the chains 41 and 42 are carried on inner and outer sprockets 46 and 47 which are axially spaced on idler shaft 48. Pairs of casing engaging and constricting cross bars 49 and 50 are arranged on the chains 41 and 42 at longitudinally spaced intervals which cross bars 49 and 50 are angular in cross section and are arranged with outwardly projecting confronting flanges positioned in spaced relation, the ends of the bars 49 and 50 being mounted on oppositely disposed chain links by means of brackets 51. The cross bars 49 and 50 align with cross bars 37 and 38 on the conveyor 27, as cooperating pairs of these bars pass along the straight portion of the path which extends between the conveyors 27 and 28. The transverse guideway 52 formed between the confronting flanges of the bars 49 and 50 receives in transverse sliding relation therein outwardly projecting casing constricting pins 53 and 54 which are carried on block members 55 and 56, each of which is suitably apertured to receive the transversely extending pins or rods 57 and 58 which are arranged beneath the cross bars 49 and 50 in parallel relation thereto and the ends of which form the pivots for connecting the chain links on which the bars 49 and 50 are mounted to the adjoining links of the chains 41 and 42. The movable pin carrying block members 55 and 56 are slotted at 59 and 60 on their inner or bottom faces to provide a cam track for receiving cam plates 61 and 62 which control the transverse movement of the block members 55 and 56 and the casing constricting pins 53 and 54 carried thereon.

Figure 7:
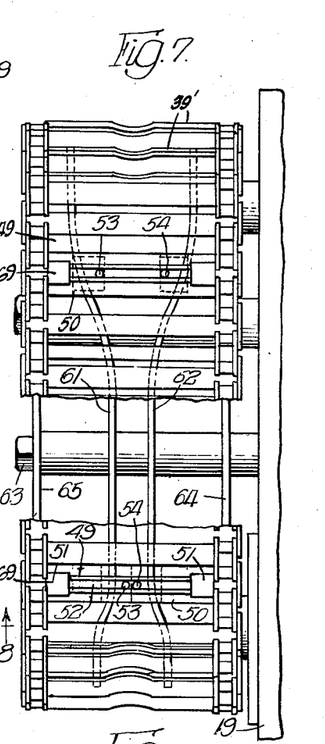
Fig. 7 is a side elevation of the dividing mechanism, with portions broken away.
Figure 8:
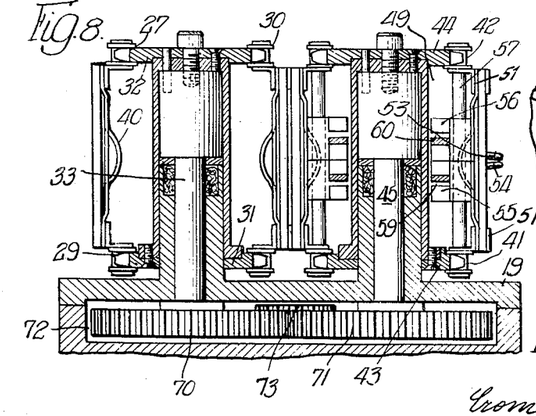
Fig. 8 is a section taken on the line 8—8 of Fig. 6.
Figure 9:
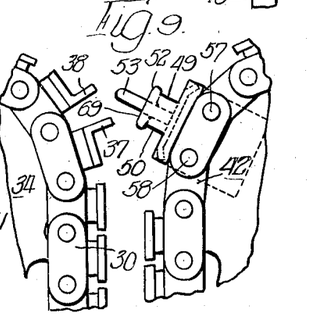
Fig. 9 is a fragmentary elevation, to an enlarged scale, at the entrance end of the dividing mechanism.

The cam plates 61 and 62 are mounted in spaced relation outwardly of the supporting bracket plate 19 by means of a pair of spaced mounting bolts 63 having suitably formed spaced sleeves thereon for positioning the plates 61 and 62 in proper relation as shown in Fig. 7. The cam forming edges of the plates 61 and 62 extend parallel with the inner edges of the chains, the plates being suitably apertured at the ends to accommodate the shaft formations 45 and 48 which carry the supporting sprockets for the chains, so that the block members 55 and 56 are at all times under the control of the cam plates 61 and 62. The cam plate supporting bolts 63 also carry inner and outer guide plates 64 and 65 which support the rollers or pins connecting the links of the chains along the straight portions of their path of movement between the conveyors 27 and 28. Similar inner and outer guide plates 66 and 67 are provided on the conveyor 27 which are supported on spaced mounting bolts 68. With the arrangement of the conveyor members and the casing constricting members, as described, the casing is first engaged on opposite sides by the cross bar members 37, 38 and 49, 50 as the casing advances between the opposed runs of the conveyors 27 and 28, the cross bars 37, 38 opening up or spreading apart as shown in Fig. 9 as they approach the cross bars 49, 50 in order to receive between them the constricting pins 53, 54 which thereafter are moved toward the casing by operation of the cam plates 61, 62 to engage the casing on the two sides at right angles to the engagement thereof by the cross bars 37, 38 and 49, 50. The conveyor chains are held or guided in a straight path by the guide plates 64, 65 and 66, 67 and the cross bars 37, 38 are held slightly spaced from the cross bars 49, 50 by the projecting outer portions 69 of the end supporting brackets 51 for the cross bars 49 and 50 which extend beyond the outer edges of the latter and engage with the opposed outer edges of the cross bars 37, 38. A plurality of transversely extending sausage engaging cross bars 39' which are identical with cross bars 39 on the conveyor 27 are arranged in spaced relation between the pairs of casing constricting bars 49, 50 and cooperate with the bars 39 to lightly grip the sausage casing as it moves between the conveyors.

The driven shafts 33 and 45 which carry the sprockets 31, 32 and 43, 44 are connected in driving relation by gears 70 and 71 (Figs. 1 and 8) which are attached to the inner ends of the shafts 33 and 45, respectively, and which are located in a recess 72 provided in the supporting plate structure 19. The gear 70 is driven by pinion 73 (Figs. 1 and 2) on the end of the horizontal shaft 74 which is journalled in suitable bearings in the horizontal, upper portion 20 of the center support bracket 12 and which is connected in driving relation with a vertically extending drive shaft 75 by interengaging bevel pinions 76 and 77 on the adjoining ends of the respective shafts 74 and 75. The vertical shaft 75 is supported in suitable bearings in the vertical or post portion 78 of the bracket 12 and a bearing support 79 located in the top of the base cabinet 10. The shaft 75 is connected at its lower end in driving relation with a vertically extending primary drive shaft 80 by means of a pulley 81 on the shaft 75, a connecting belt 82 and a pulley 83 on the primary drive shaft 80. The connecting belt 82 is adjusted to the proper tension by an idler pulley 84 which is mounted on an arm 85 adjustably secured to the bearing support 79. The primary drive shaft 80 is journalled in vertically spaced bearings 86 and 87 in the base cabinet 10 and is connected by a pulley 88 mounted thereon and drive belt 89 with the drive pulley 90 on the motor 17, the later being supported by means of a conventional, adjustable motor mounting 91 in the base cabinet 10.

The link receiving and accumulating cylindrical receptacles or pans 13 are mounted in oppositely disposed relation on the radially extending arms 15 of the pivoted bracket 14, with each receptacle 13 being adapted to be positioned in either one of two positions or stations by rotation of the bracket 14 about the vertical post 78 on which the bracket 14 is rotatably supported. In operation the bracket 14 is rotated or indexed to position one of the pans 13 beneath the dividing mechanism 11 in proper alignment for receiving successive links as they are formed by the dividing mechanism 11. The other receptacle 13 is at the same time located on the opposite side of the vertical post 78 and is arranged so that it may be readily opened to permit unloading or removal of the contents. The receptacles 13 are identical and are mounted in an identical manner on the oppositely directed arms 15 of the bracket 14. Consequently, only one of the receptacles 13 and its mounting will be described in detail.

Figure 1:
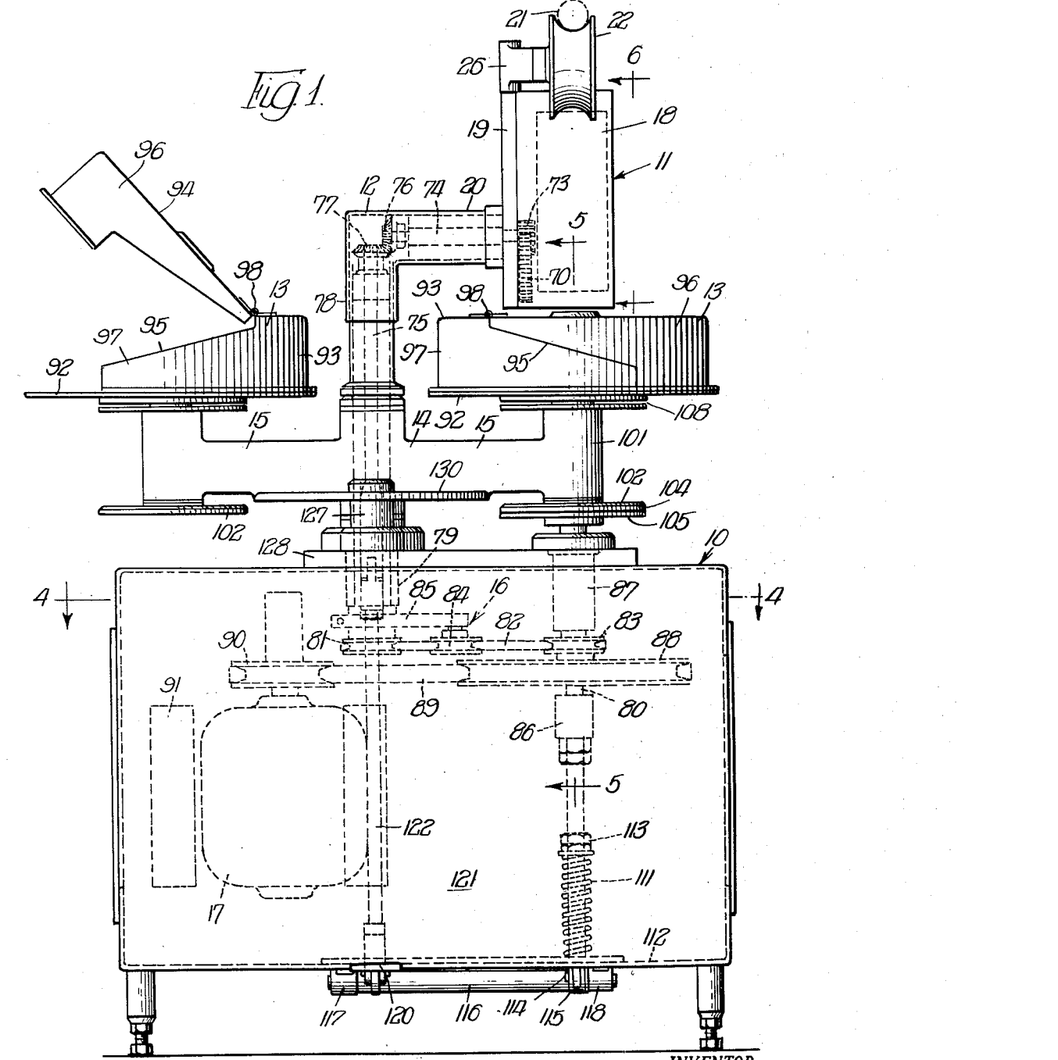
Fig. 1 is a front elevation of a linking machine embodying the principal features of the invention.

Each of the cylindrical pan-like receptacles 13 (Figs. 1, 3, and 5) comprises a circular bottom forming plate 92, upstanding peripheral side wall formations 93 and a circular top wall formation 94. The side and top wall formations 93 and 94 are divided on the line 95 which extends in a generally diagonal direction on opposite sides of the peripheral wall and across the top wall 94. The line 95 divides the receptacle into top and bottom forming sections 96 and 97, with the bottom section 97 constituting the main or base portion of the receptacle and the top section 96 constituting a cover forming portion which is connected to the base portion 97 by the hinges 98 and which is adapted to be swung to an open position as shown in Fig. 1 to provide access to the interior of the receptacle 13 for removal of the twisted links which are deposited therein when the mechanism is operated with the receptacle 13 in the link receiving position and the receptacle 13 is thereafter moved to the unloading position.

The bottom plate 92 (Fig. 5) is secured to the top end of a vertical suporting post or shaft 99 which is journalled, by means of vertically spaced sleeve bearings 100, in a vertical end bearing support 101 on the outer end of the arm 15 of the bracket 14. The vertical shaft 99 carries at its lower end a circular plate 102, secured thereto by bolts 103, which functions as one half of a driving clutch 104, the other half being a circular plate 105 which is attached to the upper end of the main drive shaft 80, and which is movable vertically in a manner to be described. One of the plates 102 and 105 is provided with a frictional element 106. A circular plate 107 is secured to the base or bottom plate 92 of the receptacle 13 adjacent the upper end of the shaft 99 which is adapted to function as one half of a brake 108, the other half being a circular plate 109 which is attached to the bearing support 101 and apertured to accommodate the shaft 99. One of the opposed face plates 107 and 109 is provided with a frictional brake element 110 so that rotation of the receptacle 13 is retarded when the plates 107 and 109 are in engaging relation. The shaft 99 has a small amount of play in its axial direction in the bearings 100 so that predetermined upward pressure on the clutch plate 102 by the clutch plate 105 lifts the shaft 99 and the receptacle 13 a predetermined distance sufficient to disengage the plates 107 and 109 of the brake 108 and permit rotation of the receptacle 13 by the power shaft 80, the latter being vertically movable in the bearings 86 and 87.

The main drive shaft 80 (Figs. 1 and 2) is normally urged in the upward direction by a compression spring 111 which engages with the floor portion 112 of the cabinet 10 at one end and a suitable stop collar 113 on the shaft 80. The lower end of the shaft 80 extends through a suitable aperture in the floor 112 of the cabinet 10 and is pivotally connected at 114 with the end of an arm 115 extending from a cross shaft 116, the latter being mounted in spaced bearings 117 and 118 on the bottom face of the floor portion 112 of the base cabinet 10. The cross shaft 116 is provided with an operating arm or foot pedal 119 having an end 120 projecting beyond the front side wall 121 of the base cabinet 10, where it is accessible for engagement by the operator to depress the shaft 80 and disconnect the clutch plates 102 and 105 for interrupting the rotation of the shaft 99 and the receptacle 13.

A locking arrangement is provided for holding the receptacle supporting bracket 14 in either of the two positions described. The locking arrangement comprises a vertically extending rod 122 (Figs. 1, 2 and 3) which is pivotally connected at its lower end at 123 with the foot pedal 119, so that depression of the pedal end 120 of the foot pedal 119 pulls the locking rod 122 downwardly simultaneously with the depression of the main drive shaft 80 which separates the clutch plates 102 and 105 and disconnects the drive for rotating the receptacle 13. The upper end 124 of the locking rod 122 is provided with a pivotally connected locking pin 125 secured thereto at 126 which is slidingly received in a guide member 127 mounted on a base plate 128 on the top of the base cabinet 10, the base plate 128 also supporting in spaced relation above the same the rotatable receptacle carrier or spider 14 and the upstanding bracket 12. The locking pin 125 is adapted to be selectively positioned in one or the other of indexing apertures 129 which are provided in oppositely disposed relation in a circular plate 130 which is secured to and rotates with the bracket 14. The pin 125 is retracted beneath the plate 130 when the foot pedal 119 is depressed and the receptacle carrying bracket 14 is freed for rotation about the post 78.

Figure 2:
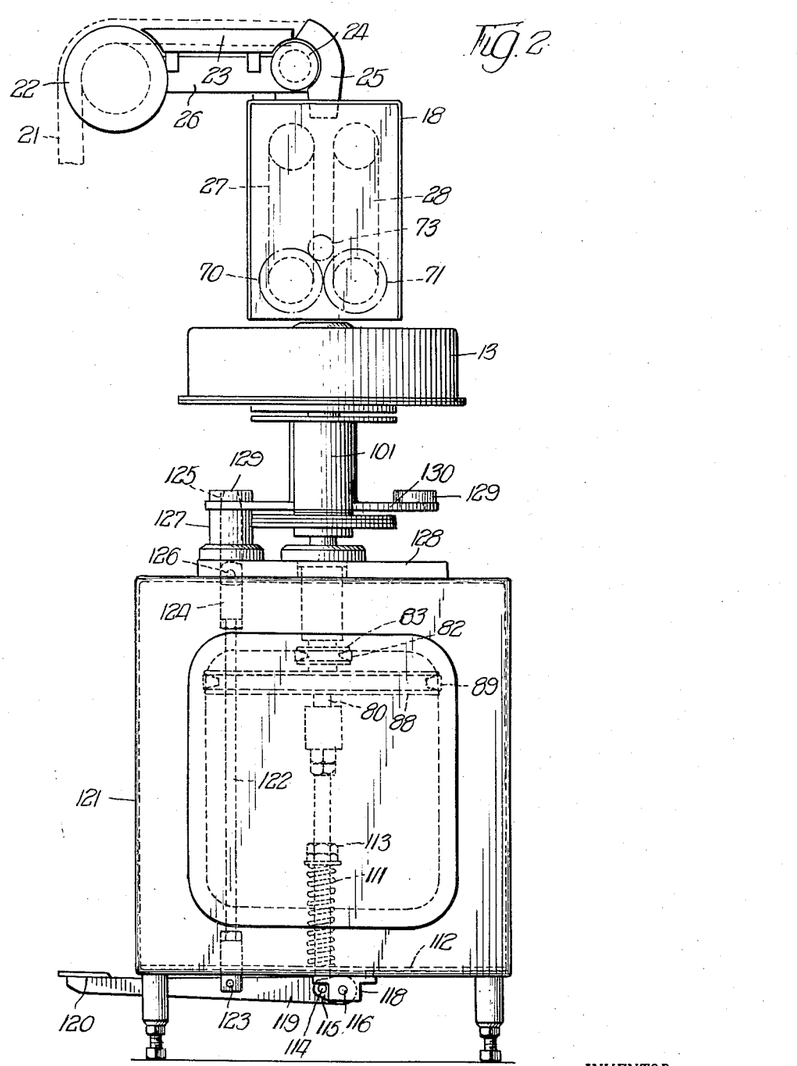
Fig. 2 is an end elevation of the linking machine.
Figure 3:
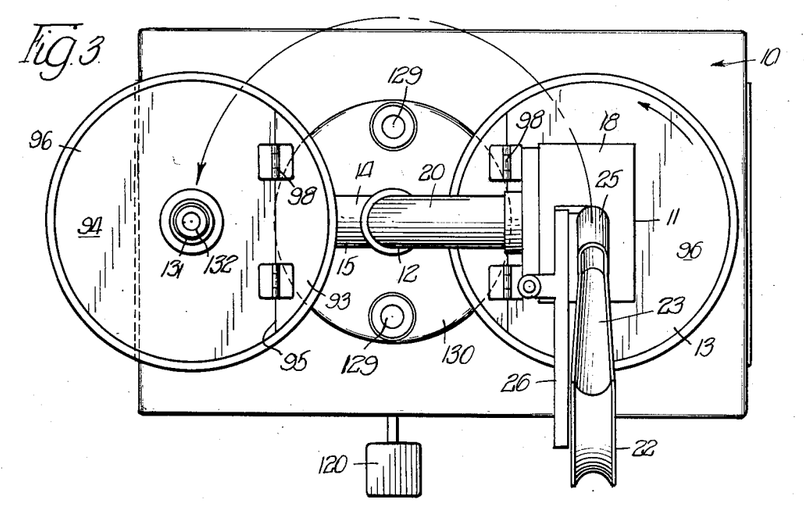
Fig. 3 is a top plan view of the linking machine.
Figure 4:
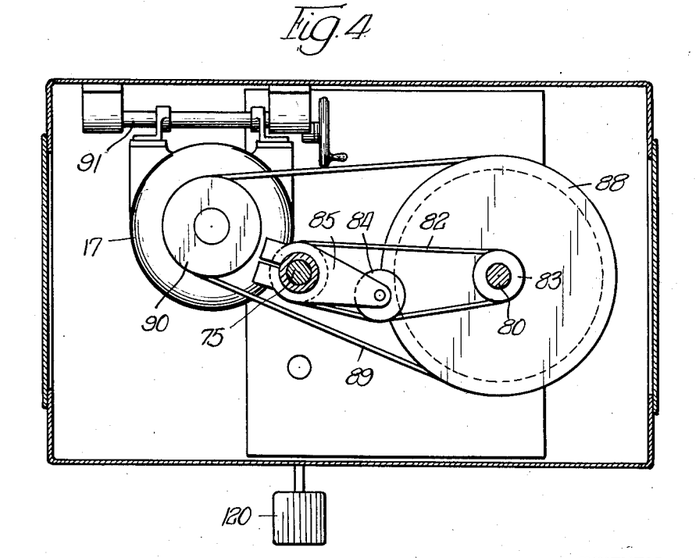
Fig. 4 is a cross section, taken on the line 4—4 of Fig. 1.
Figure 5:
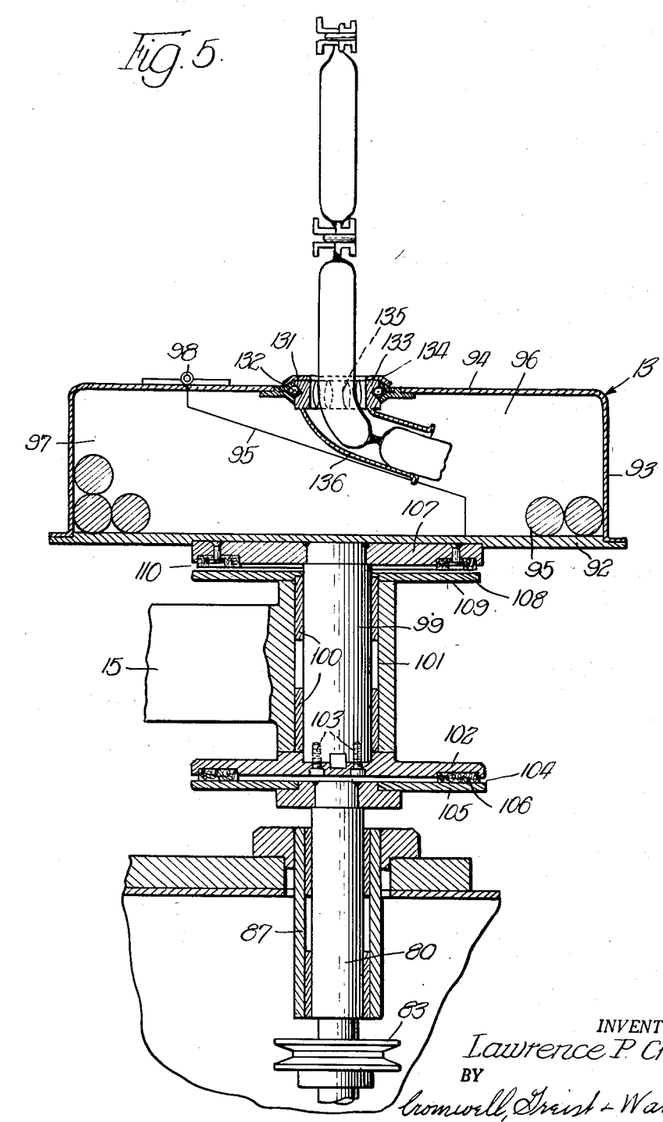
Fig. 5 is a vertical section, taken on the line 5—5 of Fig. 1, to an enlarged scale and partly schematic.
Figure 6:
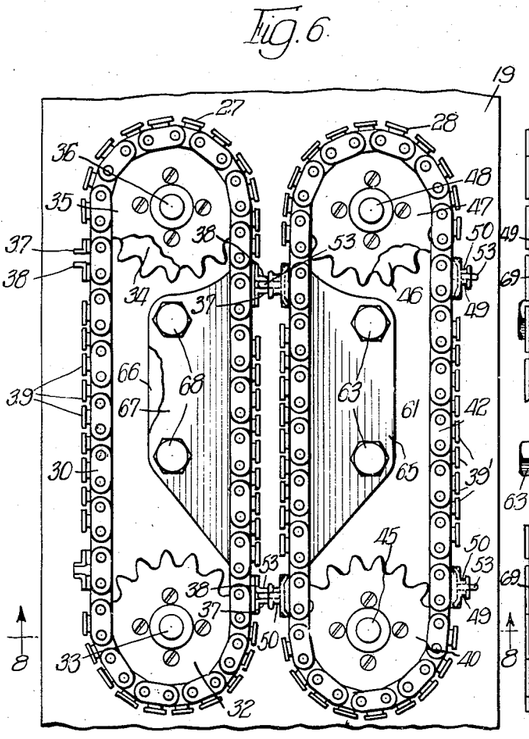
Fig. 6 is a detail elevation of the casing feeding and dividing mechanism, to an enlarged scale.

The top portion 96 of each receptacle 13 is provided with an aperture 131 (Figs. 3 and 5) in the top plate 94 which is aligned with the vertical path of the stuffed casing as the latter advances between the conveyors 27 and 28, when the receptacle 13 is in link receiving position as shown in Figs. 1 and 2. A throat member which comprises a relatively short tubular section or ring 133 and an apertured cover plate 134 is supported by bearing 132 for free rotation in the aperture 131. The inner surface of the ring member 133 is provided with spaced grooves or with corrugations 135, the grooves or corrugations extending in the axial direction. A radially extending hornlike hollow link guiding member 136 extends from the throat ring 133 into the receptacle 13.

In operating the mechanism the bracket 14 is set in locked position with one of the receptacles 13 in the sausage receiving position directly below the divider mechanism 11 where it is adapted to receive the links or casing sections as they are advanced downwardly between the dividing conveyors 27 and 28. The dividing conveyors 27 and 28 are operated in timed relation to the rotation of the receptacle 13 which is in link receiving position, the receptacle 13 being rotated at a high rate of speed sufficient to exert a centrifugal pull on the individual links as they pass through the vertical passageway formed by the throat ring 133, and thence through the radially directed passageway formed by the horn 136, the latter directing the first link in the outward direction as the leading end of the casing enters the pan to assist in initiating the twisting operation. The twisted links are urged outwardly of the axis of rotation of receptacle 13 and deposited or accumulated in coil formation around the peripheral walls 93 of the same, due to the centrifugal pull generated by the rapid rotation of the receptacle 13. Each link is axially rotated as it moves through the throat member 133 by rotation with the pan, to twist the casing section between it and the remainder of the casing which is under the control of the dividing mechanism, after which it is pulled into the coil which is formed by the preceding twisted links.

In the illustrated mechanism two link accumulating receptacles 13 are arranged on the oppositely disposed radial arms 15 of the bracket 14 so that one of the receptacles 13 may be positioned beneath the dividing mechanism 11 for receiving the twisted links while the other receptacle 13 is positioned on the opposite side of the bracket 14 where the top section 96 therof may be opened to enable the operator to remove the coil of links. With this arrangement the two receptacles 13 may be positioned so that while one is being emptied of a previously formed coil of links the other may be positioned to receive a coil being formed. The arrangement may be modified, if desired, by increasing the number of receptacles 13 employed in a single machine to three or more. This may be accomplished by providing additional radial arms 15 on the bracket 12 and accompanying receptacles 13. Also, a multiple feeding and dividing arrangement may be provided by providing additional divider mechanisms 11 and additional receptacles 13 mounted for positioning in cooperative relation therewith.

A modified form of linking machine is shown in Figs. 10 to 13 in which a single link receiving pan or link accumulating receptacle 200 is provided, which receptacle 200 is mounted in fixed relation relative to a casing dividing and constricting mechanism 201. The receptacle 200 and constricting mechanism 201 are arranged above a supporting base cabinet 202 with the casing constricting and dividing mechanism 201 being supported at the upper or outer end of an upstanding L-shaped bracket formation 203 and the accumulating receptacle 200 being mounted in aligned relation beneath the constricting and dividing mechanism 201.

The casing constricting and dividing mechanism 201 is arranged in a compartment forming casing or cabinet 204 secured at the end of the horizontal portion of the bracket formation 203. The casing constricting and dividing mechanism 201 is identical in construction with the mechanism 11 heretofore described and illustrated in Figs. 6 to 9 and functions in the same manner to constrict a stuffed casing delivered thereto and to divide the same into links of uniform length. The mechanism 201 includes operating gears, indicated at 206, which are driven by pinion 207 on the end of the horizontal shaft 208 which shaft is supported in suitable bearings in the horizontal portion 205 of the bracket 203. The shaft 208 is connected in driving relation with a vertical drive shaft 209 by interengaging bevel gears 210 and 211, on the adjoining ends of the respective shafts. The vertical drive shaft 209 is supported in suitable bearings in the upright or vertical portion 212 of the bracket 203 and extends through the bearing support 213 into the base supporting cabinet 202. At its lower end the shaft 209 carries a driving pulley 214 which is connected by a driving belt 215 with a pulley 216 on the vertical drive shaft 217 which is arranged in parallel spaced relation to the vertical drive shaft 209. A tension applying idler 218 is mounted on adjustable arm 219 which is secured on the bearing 213. The vertical drive shaft 217 is directly connected to a driving motor 220 by pulley 221, drive belt 222 and pulley 223, the latter being on the power shaft of the motor 220. The motor 220 is provided with a brake mechanism 224 which is under the control of the operator.

The main drive shaft 217 extends vertically through a top supporting plate 225 on the top of the base cabinet 202 and carries on its upper end the link accumulating receptacle 200. The shaft 217 is mounted in a suitable bearing 226 and at the upper end thereof is connected by plate 227 to the bottom plate 228 of the receptacle 200.

The link receiving and accumulating receptacle 200 is provided with upstanding peripheral walls 229 and a top wall 230 which is apertured at 231. An apertured throat member 232 is positioned in the top central aperture 231 with the throat or aperture 233 therein being larger in diameter than the diameter of the stuffed casing 234 (Figs. 12 and 13) and being corrugated or internally grooved with the grooves or corrugations running in the axial direction. The throat aperture 233 is aligned with the delivery end of the casing constricting and dividing mechanism 201 and receives the link forming casing sections 235 as they are delivered from the same.

Figures 10, 11:
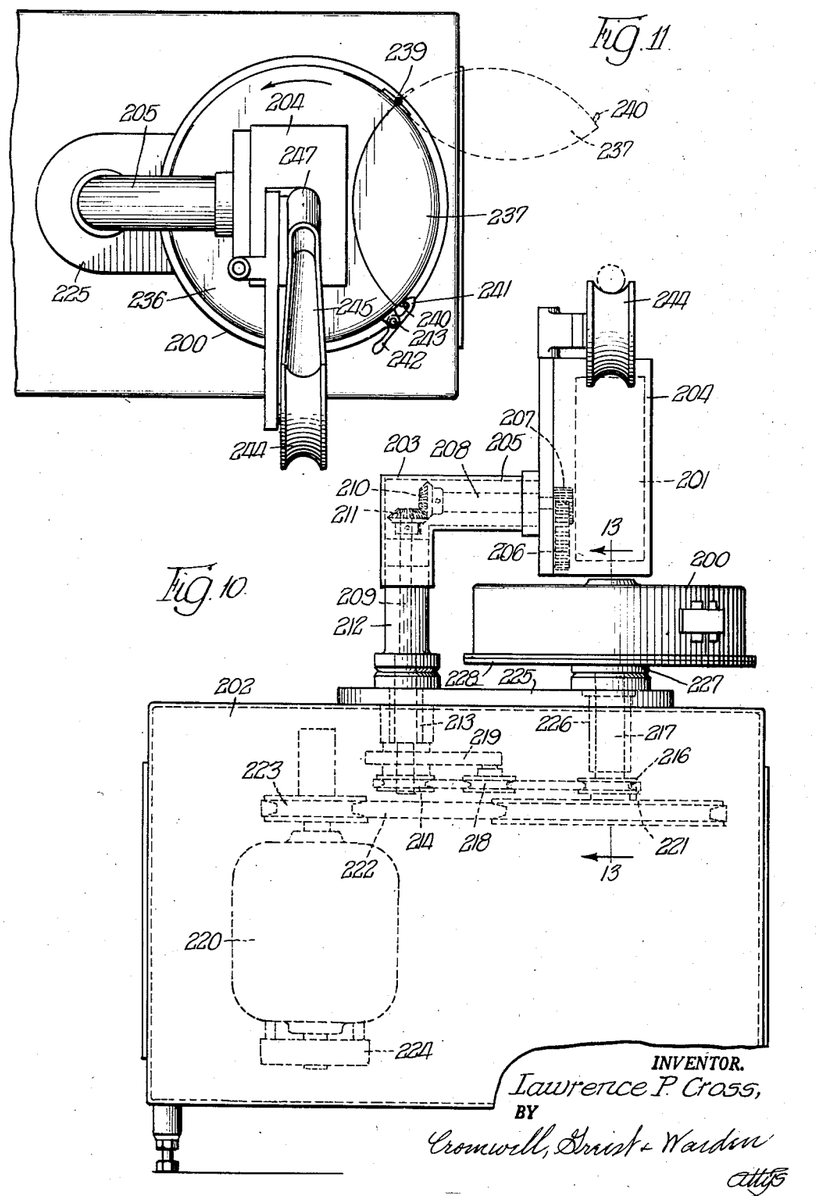
Fig. 10 is an elevation of a modified form of the invention, with portions broken away.
Fig. 11 is a plan view of the mechanism of Fig. 10, with portions broken away.

The link receptacle 200 (Figs. 11 and 12) is divided into two sections to provide a body portion 236 and a gate forming portion or section 237, the latter having a vertical side wall section 238 hingedly connected at 239 to the side wall of the body portion 236 of the receptacle. The gate section 237 is provided at its opposite peripheral edge with a keeper plate 240 which is positioned to be engaged by the hooked end 241 of a pivotally mounted latch member 242, the latter being mounted on a vertical pivot 243 and being so proportioned that the rotation of the receptacle 200 in the clockwise direction as indicated in Fig. 11 tends to urge the hooked end 241 of the latch member 242 into closed or keeper engaging position. A spring (not shown) may be employed, if desired, to normally hold the latch member 242 in engaging relation with the keeper plate 240. When the latch 242 is released the section 237 is adapted to swing to an open position to provide access to the interior of the receptacle 200, for removal of the accumulated links 235.

The stuffed meat casing 234 is adapted to be fed to the casing dividing mechanism 200 over an idler roller 244 across a horizontal guide chute 245 and around a grooved guide roller 246 into a vertically extending funnel-like guide member 249 which directs the casing between the conveyors of the dividing mechanism 201. The grooved guide rollers 241 and 246 and also guide chutes 245 and 247 are suitably mounted on a supporting bracket 248 which is attached to the housing 204 for the dividing mechanism 201.

Figures 12, 13, 14, 15:
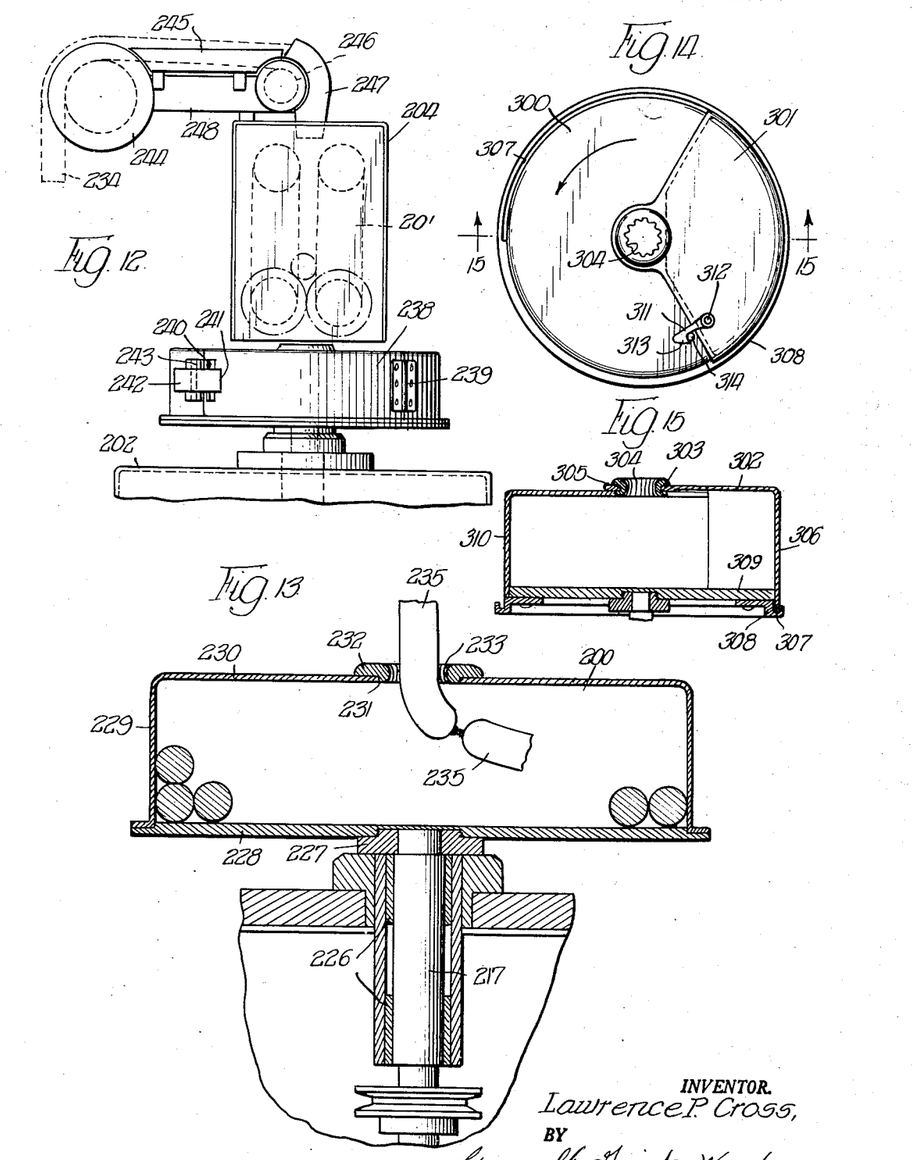
Fig. 12 is a partial end elevation.
Fig. 13 is a partial section taken on the line 13—13 of Fig. 10, to an enlarged scale.
Fig. 14 is a plan view of a modified form of link receiving receptacle.
Fig. 15 is a section taken on the line 15—15 of Fig. 14.

In operating this form of the machine the stuffed casing 234 is fed over the grooved feed roller 244, across the feed chute 245, to the feed roller 246 and through the vertical chute 247 to the constricting and dividing mechanism 201 which divides the casing 234 into link forming lengths 235 of uniform size and delivers the same in a continuously moving stream through the throat aperture 233 and into the rapidly rotating receptacle 200. The receptacle 200 is rotated by motor 220 at a relatively high rate of speed and in timed relation to the operation of the casing constricting and dividing mechanism 201. The links 235 are subjected to a centrifugal pull by the rapid rotation of the receptacle 200 as they move through the restricted opening 233 in the throat member 232 resulting in an axial rotation of each successive link sufficient to place one or more twists in the portion of the casing connecting the trailing end of the link with the leading end of the next succeeding link or casing section. The pull on the links 235 also causes them to move radially toward the peripheral wall 229 of the receptacle 200 and to arrange themselves in coil formation as shown in Fig. 13. When a predetermined length of the stuffed casing 234 has been divided and the resulting links 235 have accumulated in the receptacle 200 the rotation of the latter is stopped and the accumulated coil of links is removed upon releasing the latch member 242 and opening the gate forming section 237 of the receptacle. Thereafter the receptacle is closed and the mechanism is ready to receive the next length of stuffed casing.

A further modification is shown in Figs. 14 and 15 in which the link receiving receptacle 300 is provided with a gate forming section 301 having a top wall 302 which is apertured at 303 to receive the apertured throat ring 304. The throat ring 304 which is secured in fixed relation in the top wall of the main section of the receptacle 300 and rotates with the receptacle is formed with an external peripheral groove 305 in which the apertured portion of the wall 302 is received so that the throat ring 304 forms a pivot about which the gate section 301 is adapted to swing relative to the main section of the receptacle 300 from a closed position as shown to an open position. The lower edge of the vertical wall 306 of the gate section 301 is seated in an upwardly opening groove 307 in a bottom bracket member 308 which is attached to the bottom peripheral margin of the bottom member 309 of the receptacle 300, the groove 307 forming a circular track or guideway which guideway extends adjacent the lower edge of the wall 301 of the main portion of the receptacle 300.

The gate section 301 is held in closed position by a suitable latch member 311 pivoted thereto at 312 and having a hook forming end portion 313 which is adapted to engage a keeper pin 314 on the main portion of the receptacle. While the member 311 is urged into latched position by centrifugal force while the receptacle 300 is rotating a spring (not shown) may be provided on the pivot 312 to insure that the latch member 311 is constantly urged toward the keeper pin 314 when it is engaged with the same and accidental opening of the gate section 301 will not occur. The gate section 301 may be swung about the throat ring 304 to enable the operator to remove the completed coil of links after the twisting of a length of casing is completed and upon stopping the rotation of the receptacle 300, the latch member 311 being disengaged from the keeper pin 314 to permit the section 301 to swing open. The swinging movement of the gate section 301 toward the open position is limited by the extent of the guideway forming groove 307. The remainder of the linking mechanism may be the same as in the forms of the mechanism previously described.

While specific details of construction are illustrated in the several forms of the invention it will be understood that other details of construction may be resorted to within the spirit of the invention and also, while it is contemplated that the invention will be employed in the linking of a casing stuffed with sausage meat, it is not intended to restrict its use to a single product but it may be used wherever it is desired to divide a casing stuffed with any similar product into a series of connected and twisted links.

I claim:

1. In a sausage linking machine having a frame structure and means on said frame structure for feeding a filled sausage casing in a predetermined path, and for constricting the casing at intervals to divide the same into successive individual links of predetermined length and to advance the same beyond the forward end thereof, a container rotatably mounted on said frame structure adjacent said casing constricting and advancing means and extending across the forward end thereof, means forming an unobstructed opening into said container adjacent the axis of rotation which opening is slightly larger than the cross section of the casing to permit said casing to pass freely therethrough and which is spaced from the forward end of said casing constricting and advancing means a distance less than the length of a sausage link for receiving successively the connected links from the constricting means, drive means having a separable connection with said container for rapidly rotating said container to urge the links outwardly of the axis of rotation and to impart a twist in the constricted area between successive links as they move freely through said opening into said container, means connected to said container for bodily moving said container to a link discharging position laterally of said casing constricting means and the separable connection with said drive means and said container having a movable wall section to permit the twisted sausages to be removed therefrom.

2. In a sausage linking machine having a fixed frame structure for supporting thereon mechanism for advancing a filled sausage casing in a predetermined path and for constricting the casing at intervals to divide the same into successive individual links of predetermined length, a generally cylindrical container, a swingable frame on said supporting structure, means rotatably mounting said container on said swingable frame, said swingable frame being mounted for movement to a position adjacent said casing advancing and constricting mechanism, means forming an unobstructed opening into said container adjacent the axis of rotation which opening is slightly larger than the cross section of the casing to permit said casing to pass freely therethrough, a clutch controlled drive means connected to said container, said drive means being releasably connected to said container and being adapted to rapidly rotate said container to urge the links outwardly of the axis of rotation and to impart a twist in the constricted area between successive links as they move freely through said opening into said container, said swingable frame being movable to automatically position said container laterally of said casing advancing and constricting mechanism upon release of the same from said drive means and said container having movable side and top wall sections to permit the twisted sausages to be removed therefrom.

3. In a linking machine having means for continuously dividing a stuffed casing at spaced points and forming therein successive links while simultaneously advancing said links, a link receiving mechanism positioned adjacent said casing dividing means for twisting each successive link and accumulating the twisted links in coil formation, said link receiving mechanism comprising a generally cylindrical container and a swingably mounted supporting bracket therefor, said bracket being adapted to position said container across the forward end of said casing dividing and advancing means, said container having a top wall with an aperture therein which is adapted to be aligned with and spaced a predetermined distance from the casing dividing and advancing means, an apertured throat member rotatably mounted in the aperture in said top wall, said container being mounted in said supporting bracket for rotation relative thereto, and drive means connected to said container for rapidly rotating said container to urge the links outwardly of the axis of rotation thereof and to impart a twist between each link and the next succeeding link as the individual links are delivered to said throat member, and the connection between said drive means and said container being separable to permit said supporting bracket to be swung to move said container away from said casing dividing and advancing means.

4. In a sausage linking machine having mechanism for advancing a filled sausage casing in a predetermined path and for constricting the casing at spaced intervals to divide the same into individual links, a twisting mechanism comprising a cylindrical link receiving receptacle rotatably and swingably mounted adjacent the casing advancing and constricting mechanism, said receptacle being located in one position to receive each link as it is released by said advancing and constricting mechanism and being swingable to another position remote from said advancing and constricting mechanism, power means separably connected to said cylindrical receptacle for rapidly rotating the same about its axis when said receptacle is in link receiving position, and rotatable means forming a relatively small unobstructed passageway to guide the links into the receptacle adjacent the axis of rotation thereof, said passageway having a radially extending portion through which the links are adapted to advance freely in the direction of their longitudinal axis, said cylindrical receptacle when in said link receiving position being rotated with sufficient speed to exert a centrifugal pull on said links as said links advance freely through said passageway into said receptacle whereby to impart a twist in the constricted area between each link and the next succeeding link and to deposit the twisted links in coil formation within the receptacle, and said receptacle when swung to a position remote from said advancing and constricting mechanism being disconnected from said power means for removal of the twisted links therefrom.

5. In a sausage linking machine having means for feeding a filled sausage casing in a predetermined path and for constricting the casing at intervals to divide the same into successive individual links of predetermined length, a twisting mechanism comprising a generally cylindrical container, mounted adjacent said casing feeding and constricting means for rotation about its longitudinal axis and for movement bodily away from said casing feeding and constricting means, means forming an unobstructed opening into said container adjacent its axis of rotation, which opening is slightly larger than the cross section of the casing to permit said casing to pass freely therethrough and which is normally spaced from said casing feeding and constricting means a distance less than the length of a sausage link for receiving successively the connected links from the constricting feeding and means; and a drive means having a separable connection with said container for rapidly rotating said container when it is positioned adjacent said casing feeding and constricting means to urge the links outwardly of the axis of rotation and thereby to impart a twist in the constricted area between successive links as they move freely through said opening into said container, said container being bodily movable away from said casing constricting means and said drive means upon said drive means being disconnected from said container and said container having a movable side wall section to permit the twisted sausages to be removed therefrom.

6. In a linking machine having mechanism for advancing a filled casing in a predetermined path and for constricting the filled casing at spaced intervals to divide the same into a plurality of link formations of predetermined length while said casing is advancing, a twisting mechanism adjacent said casing advancing and constricting means, said twisting mechanism comprising a cylindrical receptacle mounted for rotation about its longitudinal axis, said receptacle having a closure forming plate member secured at one end thereof and a second closure forming plate member secured at the other end thereof adjacent said casing advancing and constricting means, said second plate member being provided with a central aperture, a hollow throat member mounted for free rotation in said aperture, said hollow throat member providing an unobstructed passageway of a diameter slightly greater than the diameter of the link formations, a horn on said throat member providing an extension of said passageway for guiding the links in a generally radial direction within said receptacle, and means connected with said cylindrical receptacle for rapidly rotating said cylindrical receptacle whereby a twist is imparted to successive links and the twisted links are caused to arrange themselves in coiled relation around the periphery of the receptacle.

7. In a sausage linking machine having a frame structure and means thereon for feeding a filled sausage casing in a predetermined path and for constricting the casing at intervals to divide the same into successive individual links of predetermined length, a twisting mechanism comprising a pan-like link receiving container mounted on said frame structure for rotation about its longitudinal axis and extending at the end of said casing feeding and constricting means, said container having a top wall, a bottom wall and peripheral side walls, said top wall having an opening into said container adjacent the axis of rotation which opening is somewhat larger than the cross section of the casing to permit said casing to pass freely therethrough while guiding the casing into the container, and which opening is spaced from said casing feeding and constricting means a distance less than the length of a sausage link for receiving successively the connected links from the casing feeding and constricting means, and drive means having a separable connection with the container bottom wall whereby said container may be rapidly rotated to urge the links outwardly of the axis of rotation and to impart a twist in the constricted area between successive links as they move freely through said opening into said container, means connected with said container for moving said container laterally of the casing feeding and constricting means upon disconnecting said drive means, and said container having a movable wall section to permit the twisted links to be removed therefrom.

8. In a linking machine having means for feeding a stuffed casing in a predetermined path and for constricting the casing at intervals to divide the same into successive individual links of predetermined length, a twisting mechanism comprising a cylindrical link receiving container rotatably mounted adjacent said casing constricting means and having an end aligned with said casing feeding and constricting means, said container having a relatively small opening in said end adjacent the axis of rotation which opening is somewhat larger than the cross section of the casing to permit said casing to pass freely therethrough while guiding the casing into the container, and which opening is spaced from said casing constricting means a distance less than the length of a link for receiving successively the connected links from the feeding and constricting means, and drive means for said container having a connection with the opposite end thereof, said drive means rotating said container at a relatively high speed sufficient to pull the links outwardly of the axis of rotation and to impart a twist in the constricted area between successive links as they move freely through said opening into said container, said container having a discharge opening in a side wall thereof to permit the twisted links to be removed therefrom and a pivoted cover member for said discharge opening.

9. In a linking machine having means for feeding a stuffed casing in a predetermined path and for constricting the casing at intervals to divide the same into successive individual links of predetermined length, a twisting mechansim comprising a rotatable container mounted adjacent said casing feeding and constricting means and extending across the end thereof, drive means connected to said container for rapidly rotating said container about its axis, said container being closed at its opposite ends and a throat member in one end forming a relatively small unobstructed passageway into said container adjacent the axis of rotation, which passageway is slightly larger than the cross section of the casing to permit said casing to pass freely therethrough, and said throat member being spaced from said casing feeding and constricting means a distance less than the length of a link for receiving successively the connected links from the feeding and constricting means, whereby rapid rotation of said container exerts a pull on the links and moves the links through said throat member and outwardly of the axis of rotation to impart a twist in the constricted area between successive links as the links move continuously and freely through said throat member into said container, and said container having a section of its side wall movable to provide a discharge opening and to permit the twisted links to be removed therefrom.

10. In a linking machine having mechanism for advancing a filled casing in a predetermined path and for constricting the filled casing at spaced intervals to divide the same into a plurality of link formations of predetermined length while said casing is advancing, a twisting mechanism adjacent said casing advancing and constricting means comprising a cylindrical receptacle mounted for rotation about its longitudinal axis, said receptacle having end closure forming plate members, the closure forming plate member at the end adjacent the casing advancing and constricting mechanism having a central aperture, a hollow throat member mounted in said aperture, said hollow throat member providing an unobstructed passageway, of a diameter slightly greater than the diameter of the link formations, into said receptacle, means having a separable connection with said receptacle for rapidly rotating said receptacle with sufficient speed to exert a pull on said links and draw the links through the throat member in a generally radial direction whereby a twist is imparted to successive links and the twisted links are distributed in coiled relation around the periphery of the receptacle, and means connected with said receptacle for moving said receptacle from a position where it is connected with said receptacle rotating means to a disconnected position for removal of the coil of links.

11. In a linking machine having mechanism for advancing a filled casing in a predetermined path and for constricting the filled casing at spaced intervals to divide the same into a plurality of link formations of predetermined length while said casing is advancing, a twisting mechanism adjacent said casing advancing and constricting means comprising a cylindrical receptacle mounted for rotation about its longitudinal axis, said receptacle having closure forming members at opposite ends thereof with one of said closure forming members having a central aperture, a hollow throat member mounted for free rotation in said aperture, said hollow throat member providing an unobstructed passageway of a diameter slightly greater than the diameter of the link formations, and means connected to the other one of said closure forming members of said receptacle for rapidly rotating said cylindrical receptacle with sufficient speed to exert a centrifugal pull on the successive link formations in a generally radial direction outwardly of said throat member, whereby a twist is imparted to the successive links and the twisted links are distributed in coiled relation around the inner periphery of the receptacle.

12. In a linking machine having mechanism for advancing a filled casing in a predetermined path and for constricting the filled casing at spaced intervals to divide the same into a plurality of link formations of predetermined length while said casing is advancing, a twisting mechanism adjacent said casing advancing and constricting means comprising a cylindrical receptacle mounted for rotation about its longitudinal axis, said receptacle having closure forming members at opposite ends thereof with one of said closure forming members having a central aperture, a hollow throat member mounted in said aperture in fixed relation relative to the rotation of the receptacle, said hollow throat member having axially extending internal groove formations and providing an unobstructed passageway into said receptacle which is of a diameter somewhat greater than the diameter of the link formations, and means connected to the other one of said closure forming members of said receptacle for rapidly rotating said cylindrical receptacle with sufficient speed to exert a centrifugal pull on the successive link formations and urge the same in a generally radial direction outwardly of said throat member, whereby a twist is imparted to successive links and the twisted links are distributed in coiled relation around the inner periphery of the receptacle.

13. In a linking machine having a supporting frame, an upright supporting post, a laterally extending bracket arm on said post for supporting thereon mechanism for receiving a length of filled sausage casing and for dividing said filled casing into link forming sections while advancing the same in a predetermined path, a cross bar pivotally mounted intermediate its ends on said supporting post, a cylindrical link receiving receptacle rotatably mounted on a vertically extending axis on the end of said cross bar and being movable by rotation of said cross bar to and from a position aligned beneath said casing dividing mechanism, said receptacle having a bottom, vertical side walls and a top closure, said top closure having a central aperture and a hollow throat member mounted for free rotation in said aperture, said hollow throat member providing an unobstructed passageway of a diameter slightly greater than the diameter of the links, and a driven member positioned in spaced relation beneath said bracket arm and having a separable connection with said receptacle, when said receptacle is aligned beneath said casing dividing mechanism, to rotate said receptacle at a relatively high speed sufficient to pull successive links through said throat member and impart a twist to the successive links, said receptacle being movable by rotation of said cross bar to a position where it is out of alignment with said casing dividing mechanism and free of said driven member.

14. In a linking machine having a supporting frame, an upright supporting post, a lateral bracket arm on said post adapted to support thereon a mechanism for receiving a length of filled sausage casing and for dividing said filled casing into link forming sections while advancing the same in a predetermined path, a cross bar pivotally mounted intermediate its ends on said frame, a cylindrical link receiving receptacle rotatably mounted with its longitudinal axis extending in a vertical direction on each end of said cross bar and adapted to be moved by rotation of said cross bar to and from a position aligned beneath said casing dividing mechanism, each said receptacle having top and bottom walls connected by vertical side walls, said top wall having a central aperture and a hollow throat member mounted for free rotation in said aperture which hollow throat member provides an unobstructed passageway of a diameter slightly greater than the diameter of the links, and drive means having a separable connection with the bottom of said receptacle when it is positioned beneath said casing dividing means to rotate said receptacle with sufficient speed to exert a pull on said links in a generally radial direction whereby to impart a twist to successive links as they advance through the throat member and to distribute the links in coiled relation in the receptacle, each said receptacle being movable by rotation of said cross bar to a position where it is out of alignment with said casing dividing mechanism and disconnected from said drive means.

15. In a linking machine having mechanism for advancing a length of stuffed casing along a predetermined path and for dividing the casing into successive portions each forming a link of uniform length by constricting the casing between the divided links, a link accumulating and coil forming cylindrical receptacle mounted adjacent said casing advancing dividing and constricting means for rotation about its longitudinal axis, drive means having a separable connection with the bottom end of said receptacle for rapidly rotating said receptacle about its axis, means in the top of said receptacle aligned with said dividing and constricting means for receiving the links therefrom and for imparting a twist in the constricted casing section between each link and the remaining portion of the stuffed casing as each link is drawn into said receptacle by the rapid rotation thereof, and means connected to said receptacle for moving said receptacle laterally of its axis of rotation and away from said drive means to a non-rotating position for removal of the coil of links from the machine.

16. In a linking machine having mechanism for advancing a filled casing in a predetermined path and for constricting the filled casing at spaced intervals to divide the same into a plurality of link formations of predetermined length while said casing is advancing a twisting mechanism adjacent said casing advancing and constricting means comprising a cylindrical receptacle mounted for rotation about its longitudinal axis, said receptacle having closure forming plate members secured at opposite ends with one of said closure forming plate members having a central aperture, a hollow throat member in fixed relation in said aperture, said hollow throat member providing an unobstructed passageway, of a diameter slightly greater than the diameter of the link formations, into said receptacle, means connected to said receptacle for rapidly rotating said receptacle with sufficient speed to exert a pull on said links in a generally radial direction whereby a twist is imparted to successive links and the twisted links are distributed in coiled relation around the periphery of the receptacle, and said receptacle having a pivotally and slidably mounted peripheral side wall section adapted to be moved to an open position to permit removal of the coil of twisted links from said receptacle.

17. In a linking machine having mechanism for advancing a filled casing in a predetermined path and for constricting the filled casing at spaced intervals to divide the same into a plurality of link formations of predetermined length while said casing is advancing, a twisting mechanism adjacent said casing advancing and constricting means comprising a cylindrical receptacle mounted for rotation about its longitudinal axis, said receptacle having closure forming members at opposite ends thereof with one of said closure forming members having a central aperture, a hollow throat member mounted for free rotation in said aperture, said hollow throat member providing an unobstructed passageway of a diameter slightly greater than the diameter of the link formations, means connected to said cylindrical receptacle for rapidly rotating said cylindrical receptacle with sufficient speed to exert a centrifugal pull on the successive link formations in a generally radial direction outwardly of said throat member, whereby a twist is imparted to the successive links and the twisted links are distributed in coiled relation around the inner periphery of the receptacle, and said cylindrical receptacle having a movable peripheral wall section which is pivotally mounted for opening movement to provide access to the interior of the cylindrical receptacle for removal of the twisted links.

18. In a linking machine having mechanism for advancing a filled casing in a predetermined path and for constricting the filled casing at spaced intervals to divide the same into a plurality of link formations of predetermined length while said casing is advancing, a twisting mechanism adjacent said casing advancing and constricting means comprising a cylindrical receptacle mounted for rotation about its longitudinal axis, said receptacle having closure forming members at opposite ends thereof, with one of said closure forming members having a central aperture, a hollow throat member mounted for free rotation in said aperture, said hollow throat member providing an unobstructed passageway of a diameter slightly greater than the diameter of the link formations, means connected to said cylindrical receptacle for rapidly rotating said cylindrical receptacle with sufficient speed to exert a centrifugal pull on the successive link formations in a generally radial direction outwardly of said throat member, whereby a twist is imparted to the successive links and the twisted links are distributed in coiled relation around the inner periphery of the receptacle, and said cylindrical receptacle having an opening in the side wall for removing the coil of links therefrom, a pivotally mounted cover for said opening, and latch means for holding said cover in closed position.

19. In a linking machine having mechanism for advancing a filled casing in a predetermined path and for constricting the filled casing at spaced intervals to divide the same into a plurality of link formations of predetermined length while said casing is advancing, a twisting mechanism adjacent said casing advancing and constricting means comprising a cylindrical receptacle mounted for rotation about its longitudinal axis, said receptacle having closure forming members at opposite ends thereof with one of said closure forming members having a central aperture, a hollow throat member mounted in fixed relation in said aperture, said hollow throat member having axially extending internal groove formation and providing an unobstructed passageway into said receptacle which is of a diameter somewhat greater than the diameter of the link formations, means connected to said cylindrical receptacle for rapidly rotating said cylindrical receptacle with sufficient speed to exert a centrifugal pull on the successive link formations and urge the same in a generally radial direction outwardly of said throat member, whereby a twist is imparted to successive links and the twisted links are distributed in coiled relation around the inner periphery of the receptacle, and said cylindrical receptacle having an opening in the side wall for discharging the coil of twisted links, a cover for said opening, and means to pivot said cover about said throat member.

References Cited in the file of this patent

UNITED STATES PATENTS

| | | |
|---|---|---|
| 1,545,586 | Kruse | July 14, 1925 |
| 1,974,615 | Kelly | Sept. 25, 1934 |
| 2,138,260 | Trabold | Nov. 29, 1938 |
| 2,641,798 | Anderson | June 16, 1953 |
| 2,675,753 | Eber | Apr. 20, 1954 |
| 2,689,972 | Cross | Sept. 28, 1954 |

FOREIGN PATENTS

| | | |
|---|---|---|
| 20,096 | Great Britain | A. D. 1912 |

UNITED STATES PATENT OFFICE
CERTIFICATE OF CORRECTION

Patent No. 2,845,655                                                   August 5, 1958

Lawrence P. Cross

It is hereby certified that error appears in the printed specification of the above numbered patent requiring correction and that the said Letters Patent should read as corrected below.

Column 2, line 4, for "contsricted" read -- constricted --; column 5, line 60, for "later", read -- latter --; column 9, line 65, for "wall 301" read -- wall 310 --; column 11, lines 72 and 73, for "constricting feeding and" read -- feeding and constricting --.

Signed and sealed this 11th day of November 1958.

(SEAL)
Attest:
KARL H. AXLINE

Attesting Officer

ROBERT C. WATSON
Commissioner of Patents